United States Patent
Ehrman et al.

(10) Patent No.: US 6,318,398 B1
(45) Date of Patent: Nov. 20, 2001

(54) FUEL EXPANSION TANK

(75) Inventors: Moshe Ehrman; Udi Orenstein; Zohar Moalem, all of D. N. Halutza (IL)

(73) Assignee: Raviv Precision Injection Molding, Halutza (IL)

(*) Notice: Subject to any disclaimer, the term of this patent is extended or adjusted under 35 U.S.C. 154(b) by 0 days.

(21) Appl. No.: 09/734,007

(22) Filed: Dec. 12, 2000

(51) Int. Cl.⁷ .................................................. G05D 13/04
(52) U.S. Cl. ........................ 137/43; 137/571; 137/587; 123/516; 123/519
(58) Field of Search ..................... 137/587, 43, 571; 123/516, 519

(56) References Cited

U.S. PATENT DOCUMENTS

| | | | |
|---|---|---|---|
| 4,815,436 | * 3/1989 | Sasaki et al. | 123/520 |
| 4,872,439 | * 10/1989 | Sonoda et al. | 123/519 |
| 4,962,744 | * 10/1990 | Uranishi et al. | 123/520 |
| 5,193,511 | * 3/1993 | Fujino | 123/520 |
| 5,292,922 | * 3/1994 | Denz | 123/520 |
| 6,000,426 | * 12/1999 | Tuckey et al. | 137/588 |

* cited by examiner

*Primary Examiner*—John Rivell
*Assistant Examiner*—Thomas L. McShane

(57) ABSTRACT

A fuel expansion device for a vehicle fuel tank, the device comprising a housing formed of a first housing member and a second housing member, both made of an essentially impermeable material and being sealingly and impermeably attached to one another. At least one inlet port for fuel fluid ingress is formed in the first member and is in flow communication with the fuel tank, and an outlet port is formed in the second member connectable to a fuel fluid handling device.

17 Claims, 4 Drawing Sheets

FUEL EXPANSION TANK

FIELD OF THE INVENTION

The present invention is in the field of vehicle fuel systems and more specifically it is concerned with an expansion device (interchangeably referred to also as an expansion tank or an expansion canister).

BACKGROUND OF THE INVENTION

Vehicle fuel systems comprise, among others, a fuel tank fitted with a filler neck, a variety of fuel valves, a tubing for supplying fuel to the ignition system and a fuel vapor treating system (typically a carbon recovery system—canister) to which fuel vapor from the fuel tank flows and is then used for enriching the fuel mixture fed to the ignition system.

Fuel fluid from the fuel tank flows via the one or more valves which are connected, via suitable tubing, to an expansion tank intermediate the fuel vapor recovery system and the tank.

The expansion tank receives fuel fluid flowing from the fuel tank which flow at a relatively high velocity owing to pressure and temperature changes, and thus vapor flowing from the fuel tank carries along with it also a considerable amount of fuel liquid in the form of droplets (as a result of venturi effect). The expansion vessel traps the fuel liquid and allows fuel vapor flow towards the vapor recovery system. The fuel liquid then returns back to the fuel tank via the tubing.

Expansion tanks are typically fitted with a roll over valve (ROV) whereby in case the vehicle rolls over, fuel liquid trapped in the expansion tank does not escape and cause hazardous risk. Alternatively there is fitted a fuel level limit valve (FLVV).

Prior art expansion tanks are made of a housing formed in a blow-molding process, as a single unit, with at least two nipples fitted thereto for connecting the respective tubing thereto. The attachment of the nipples to the housing and the attachment of the respective valve within the housing are carried out by welding, whereby the respective welding areas are not impermeable to fuel vapor, as now required in accordance with many safety and environmental standards. Other expansion tanks are made of metal and are thus expensive as they require more labor in manufacture thereof, in particular as welding is required.

It is an object of the present invention to provide an expansion tank for a vehicle's fuel system, which expansion tank is made of a plastic material and which nevertheless is essentially entirely impermeable to fuel vapor.

SUMMARY OF THE INVENTION

The present invention calls for an expansion tank usable in a vehicle's fuel system, which expansion tank is entirely made of molded plastic material and is essentially entirely impermeable to fuel vapor.

According to the present invention there is provided a fuel expansion device for a vehicle fuel tank, the device comprising a housing formed of a first housing member and a second housing member; said first and second members being made of an essentially impermeable material and being sealingly and impermeably attached to one another; at least one inlet port for fuel fluid ingress formed in said first member and being in flow communication with the fuel tank; an outlet port formed in said second member and connectable to a fuel fluid handling device.

Typically, the first housing member and the second housing member are formed with mating surfaces which are welded to one another at said surfaces in a sealed and impermeable manner, whereby the housing is essentially entirely impermeable to fuel vapor. Such welding is carried out e.g. by a heat welding or ultrasonic welding process.

According to a preferred embodiment of the invention, the first and second housing members are formed by an injection molding process during which the inlets and outlets ports as well as the mating surfaces are integrally formed with the housing mnembers. Also, the receptacle receiving the respective valve within the housing, is integrally formed therewith.

The present invention calls also for a fuel system comprising a fuel tank, one or more fuel fluid outlets from said fuel tank, a fuel recovery device and a fuel expansion device extending between the fuel fluid outlets and the fuel recovery device, said expansion device comprising a housing formed of a first housing member and a second housing member; said first and second members being made of an essentially non-permeable material and being sealingly attached to one another; at least one inlet port for fuel fluid ingress formed in said first member and being in flow communication with the one or more fuel fluid outlets; an outlet port formed in said second member and connectable to the fuel recovery device.

BRIEF DESCRIPTION OF THE DRAWINGS

In order to better understand the invention and to see how it may be carried out in practice, reference will now be made to the accompanying drawings, by way of example only, in which.

DETAILED DESCRIPTION OF ONE EMBODIMENT

Figure 1:
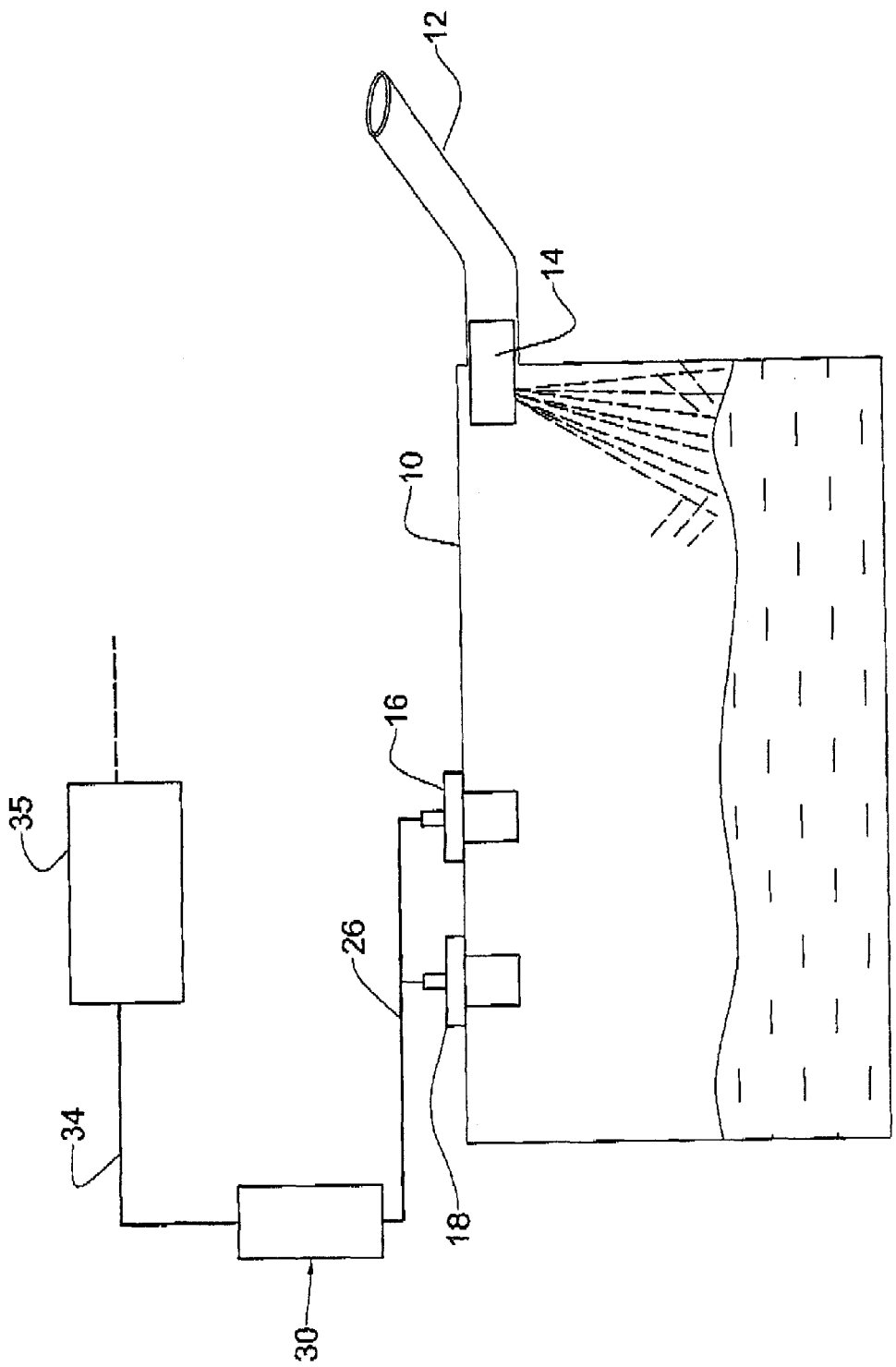
FIG. 1 is a schematic presentation illustrating a fuel system fitted with an expansion tank.

FIG. 1 is a schematic illustration of a vehicle's fuel system comprising a fuel tank 10 fitted with a fueling neck pipe fitted at its end with a filling valve 14 extending into the tank 10 for directing fuel downwardly, to minimize splashing within the tank. Tank 10 is further fitted with a roll over valve 16 and an over filling interdiction valve 18. Obviously, a variety of other valves is possible, as known per se.

Valves 16 and 18 are connected via a common tube 26 to a fuel expansion device in accordance with the present invention, generally designated 30, to which reference will be made hereinafter. Extending from an upper end of the extension device 30 there is a tube 34 connected to a fuel vapor treating device 35, namely a carbon canister. Fuel vapor is treated in canister 35 and is then further directed e.g. to the ignition system, as known per se.

Figure 2:
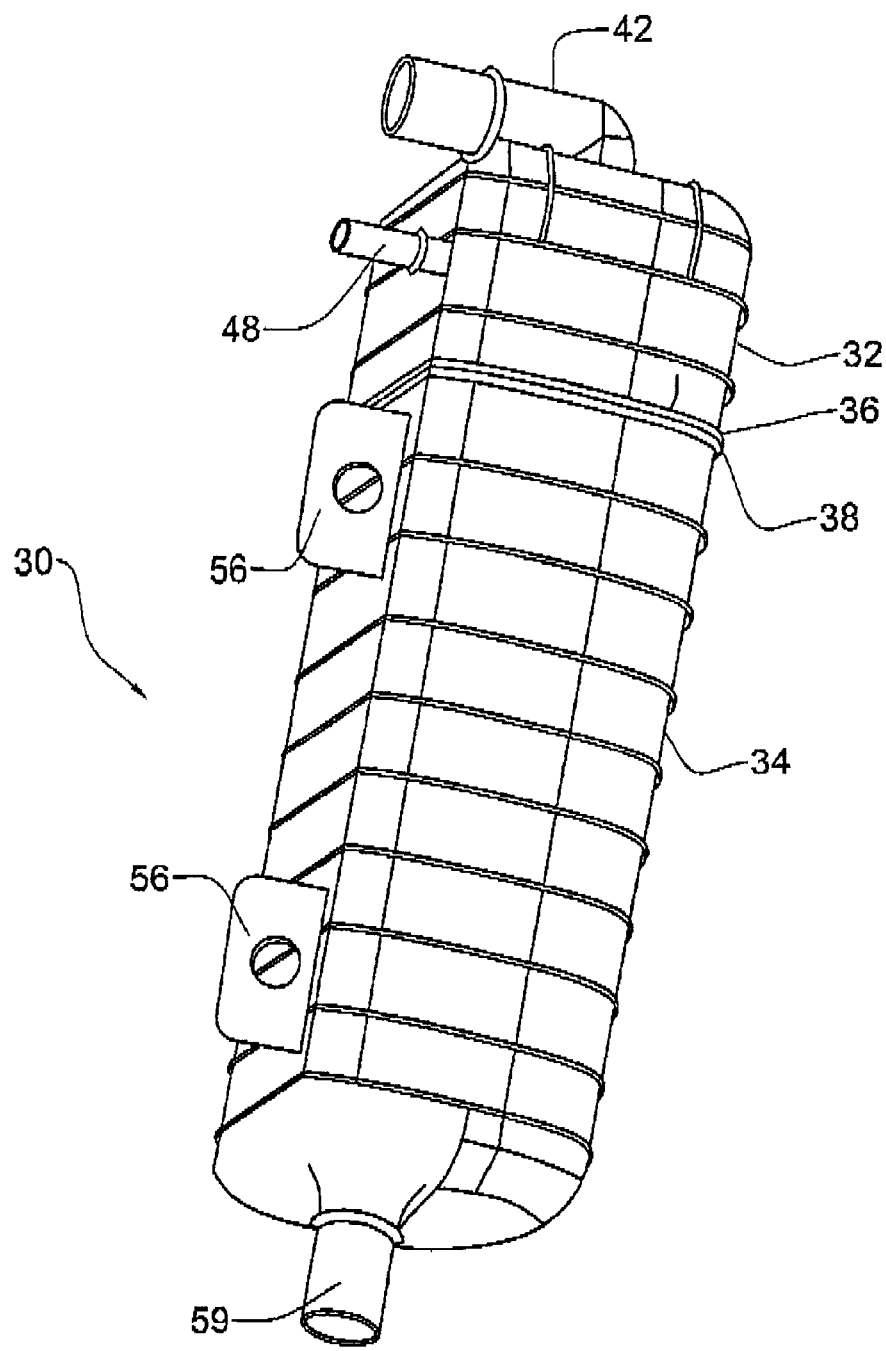
FIG. 2 is an isometric view of the expansion tank in accordance with the invention, in its assembled position.
Figure 3:
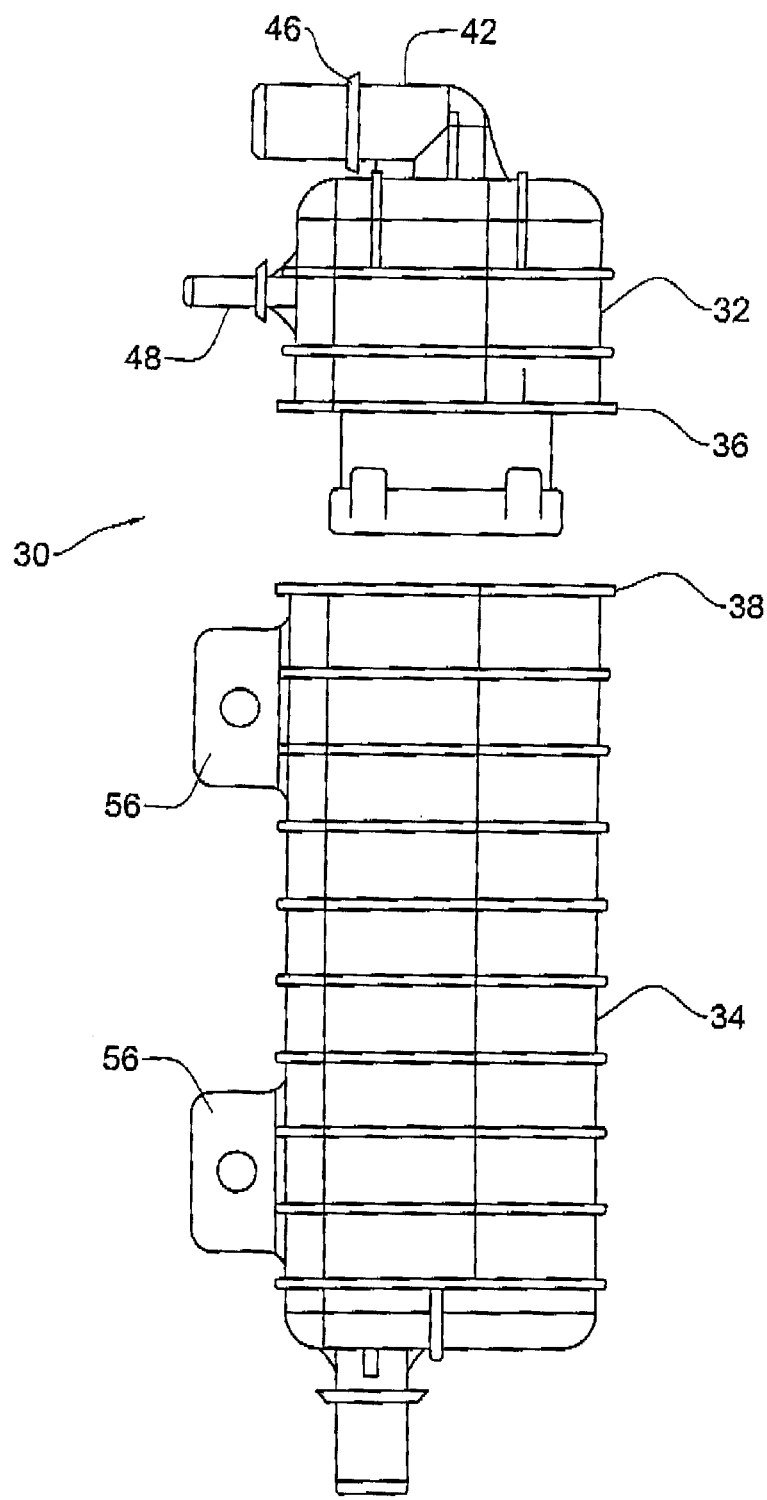
FIG. 3 is a side elevation of the device seen in FIG. 1, prior to welding the two housing components to one another.
Figure 4:
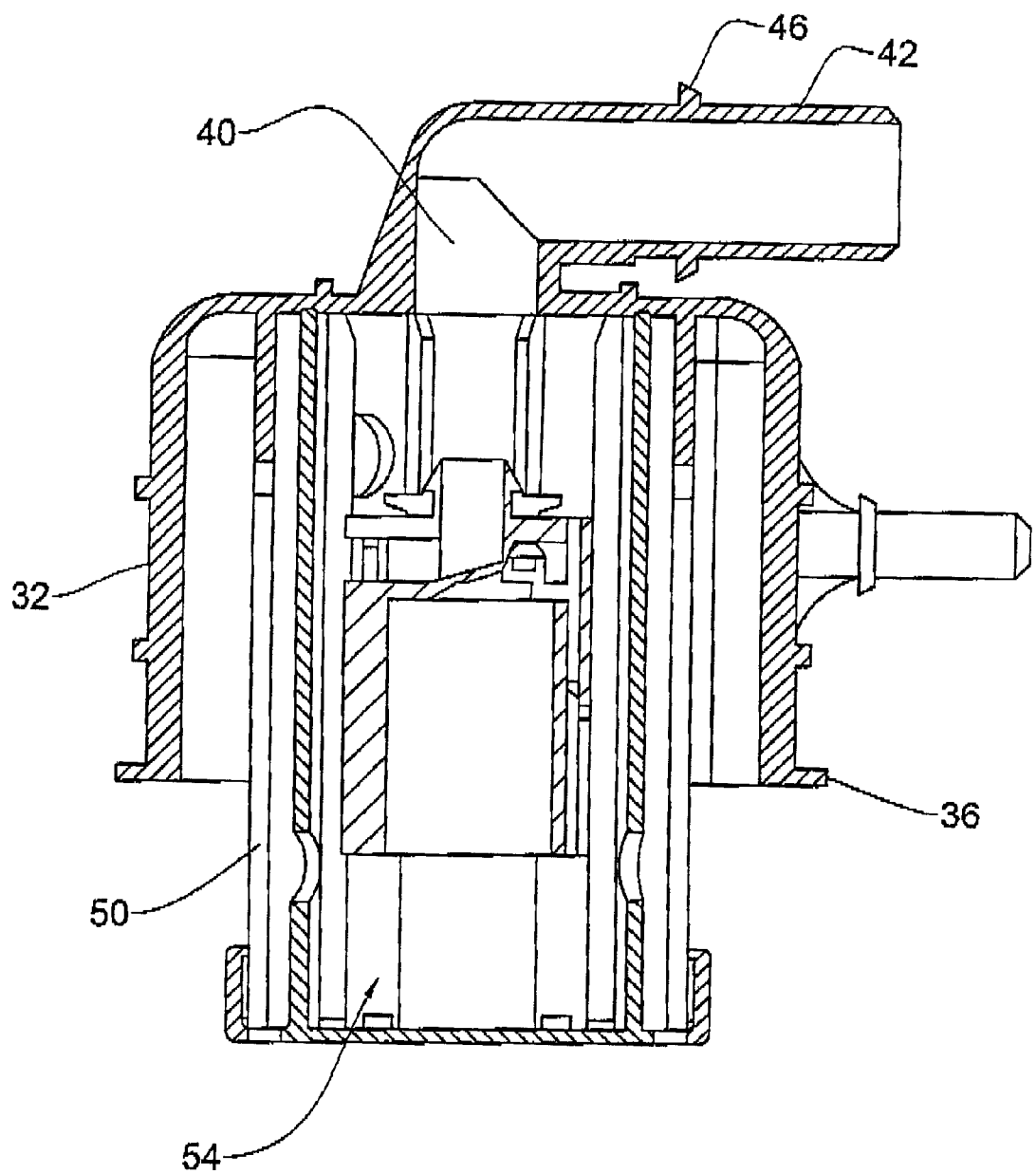
FIG. 4 is a longitudinal section of the first (top) housing member, integrally fitted with a valve housing accommodating a roll over valve.

Further reference is now being made to FIGS. 2 to 4 specifically directed to the expansion device 30 in accordance with the present invention. The device comprises a first housing member 32 and a second housing member 34 each being made of an essentially non-permeable material such as, for example, nylon (PA), acetal (POM) or other such similar materials. The first and second housing members 32 and 34 are each fitted with a circumferential flange 36 and 38 respectively adapted for mating with one another as seen in FIG. 2 whereby they are heat welded to one another, in an essentially sealed and impermeable manner, e.g. by applying heat thereto, ultrasonic welding, etc.

It is appreciated that in order to improve sealing between the two housing components there may be introduced one or more sealing gaskets between the mating members.

The first housing member 32 is fitted at its upper end with an outlet port 40 extending into an outlet connecting tube (nipple) 42 fitted with one or more annular projections 46 for engaging with a resilient tube as known per se. First housing member 32 is further fitted with a connection tube 48 for connecting to an on board diagnostic system (OBD) of the type which serves to introduce pressure into the device 30 so as to ascertain its proper function, as known per se.

The first housing 32 is also fitted, in an integral manner with a valve receptacle 50 (seen in FIG. 4) which is made integral with the first housing 32 and is adapted for accommodating a valve assembly generally designated 54 which in the present example is a roll over valve (ROV) of a known type, or any other suitable valve. The purpose of such a valve is to ensure that only vapor flows through the outlet port 40 even in case of extreme pressure within the device or upon roll over of the vehicle. Such valves are known in itself and no particular reference is made thereto.

The second housing member 34 extends below the first housing 32 and is adapted to receive a lower portion of the valve assembly, as seen in FIGS. 3 and 4. Second housing 34 has a cavity (well) and is fitted with two connecting ears 56 for attaching the device in a suitable location which is above the fuel tank (see FIG. 1) so as to allow backflow of fuel through line 26 by gravity. Formed at a bottom end of the second housing member 34 there is an inlet port extending into a nipple 59 connectable to tube 26 extending from the fuel tank.

In operation, fuel vapor from the fuel tank 10 flows through valves 18 and 18 into the expansion device 30. The vapor carries with it an amount of droplets of fuel which flow owing to the venturi effect in particular during fueling or during motion of the vehicle, i.e. when the fuel in the tank is not at rest. As the fuel carrying the droplets enters the expansion device 30, it expands into the cavity of the device giving rise to significant drop of velocity of the fuel vapor, thus causing the fuel vapor, up to some extent, to condense and flow in a reverse direction into the fuel tank.

Fuel vapor pressure builds up within the expansion tank and it then flows through the valve assembly 54 into outlet 40 and then through tube 34 into the fuel vapor treating device (canister) 35 from which it then flows on, as known per se.

Whilst some embodiments have been described and illustrated with reference to some drawings, the artisan will appreciate that many variations are possible which do not depart from the general scope of the invention, mutatis, mutandis.

What is claimed is:

1. A fuel expansion device for a vehicle fuel tank, the device comprising a housing formed of a first housing member and a second housing member; said first and second members being made of an essentially impermeable material and being sealingly and impermeably attached to one another; at least one inlet port for fuel fluid ingress formed in said first member and being in flow communication with the fuel tank; an outlet port formed in said second member and connectable to a fuel fluid handling device.

2. A fuel expansion device according to claim 1, wherein the first housing member and the second housing member are formed with mating surfaces which are welded to one another at said surfaces in a sealed and impermeable manner, whereby the housing is essentially entirely impermeable to fuel vapor.

3. A fuel expansion device according to claim 2, wherein there is provided a sealing member between the mating surfaces of the first housing member and the second housing member.

4. A fuel expansion device according to claim 1, wherein the first housing member and the second housing member are formed in an injection molding process.

5. A fuel expansion device according to claim 1, wherein the ingress port extends bellow the egress port and where in use said ingress port extends above an return opening to the fuel tank.

6. A fuel expansion device according to claim 1, wherein the housing is further formed with a connecting nipple for connecting the device to a pressure source to determine accurate operation of the device.

7. A fuel expansion device according to claim 1, wherein the housing is formed with an expansion chamber to allow fuel vapor expansion and accumulation of fuel liquid therein.

8. A fuel expansion device according to claim 7, wherein the expansion chamber is sized so as to significantly reduce flow velocity of the fuel fluid entering the device via the ingress port.

9. A fuel expansion device according to claim 1, wherein there is integrally within the housing a valve for preventing flow of fuel liquid via the egress port.

10. A fuel expansion device according to claim 9, wherein the valve is a roll over valve (ROV) or a fluid (FLVV).

11. A fuel expansion device according to claim 9, wherein the housing is integrally fitted with the valve.

12. A fuel expansion device according to claim 1, wherein the ingress port and the egress port are fitted with a connection nipple connectable to a tube, said nipples being integrally formed with the corresponding house member.

13. A fuel system comprising a fuel tank, one or more fuel fluid outlets from said fuel tank, a fuel recovery device and a fuel expansion device extending between the fuel fluid outlets and the fuel recovery device, said expansion device comprising a housing formed of a first housing member and a second housing member; said first and second members being made of an essentially non-permeable material and being sealingly attached to one another; at least one inlet port for fuel fluid ingress formed in said first member and being in flow communication with the one or more fuel fluid outlets; an outlet port formed in said second member and connectable to the fuel recovery device.

14. A fuel system according to claim 13, wherein the first housing member and the second housing member of the expansion device are formed with mating surfaces which are heat welded to one another at said surfaces in a sealed manner.

15. A fuel system according to claim 14, wherein the ingress port and the egress port of the fuel expansion device are fitted with a connection nipple connectable to a tube, said nipples being integrally formed with the corresponding house member.

16. A fuel system according to claim 1, wherein there is integrally within the housing a valve for preventing flow of fuel liquid via the egress port.

17. A fuel system according to claim 13, wherein there is integrally within the housing of the expansion device a valve for preventing flow of fuel liquid via the egress port.

* * * * *